United States Patent [19]

Grattapaglia

[11] 4,333,358
[45] Jun. 8, 1982

[54] POWER-SHIFT COUNTERSHAFT TYPE TRANSMISSION

[75] Inventor: Giorgio P. Grattapaglia, Turin, Italy

[73] Assignee: Fiat-Allis Macchine Movimento Terra S.p.A., Stupinigi, Italy

[21] Appl. No.: 169,406

[22] Filed: Jul. 16, 1980

[30] Foreign Application Priority Data

Dec. 18, 1979 [IT] Italy .................. 69433 A/79

[51] Int. Cl.³ .................. F16H 3/08; F16H 57/02
[52] U.S. Cl. .................. 74/359; 74/606 R
[58] Field of Search .................. 74/606 R, 606 A, 325, 74/357, 359, 360

[56] References Cited

U.S. PATENT DOCUMENTS

| 1,155,163 | 9/1915 | Rice | 74/606 R |
| 2,342,105 | 2/1944 | Jacobi | 74/606 R |
| 2,743,627 | 5/1956 | Christenson | 74/606 R |
| 3,860,844 | 1/1975 | Hetzel | 74/606 R |

FOREIGN PATENT DOCUMENTS 951917  3/1964  United Kingdom ............ 74/606 R

Primary Examiner—Kenneth Dorner
Attorney, Agent, or Firm—Robert A. Brown

[57] ABSTRACT

A multi-speed forward and reverse countershaft type power-shift transmission having speed clutches, forward and reverse clutches, housing compartments, a control valve attachment location and various related components arranged whereby the transmission is capable of being produced at relatively low cost and of conserving energy.

9 Claims, 4 Drawing Figures

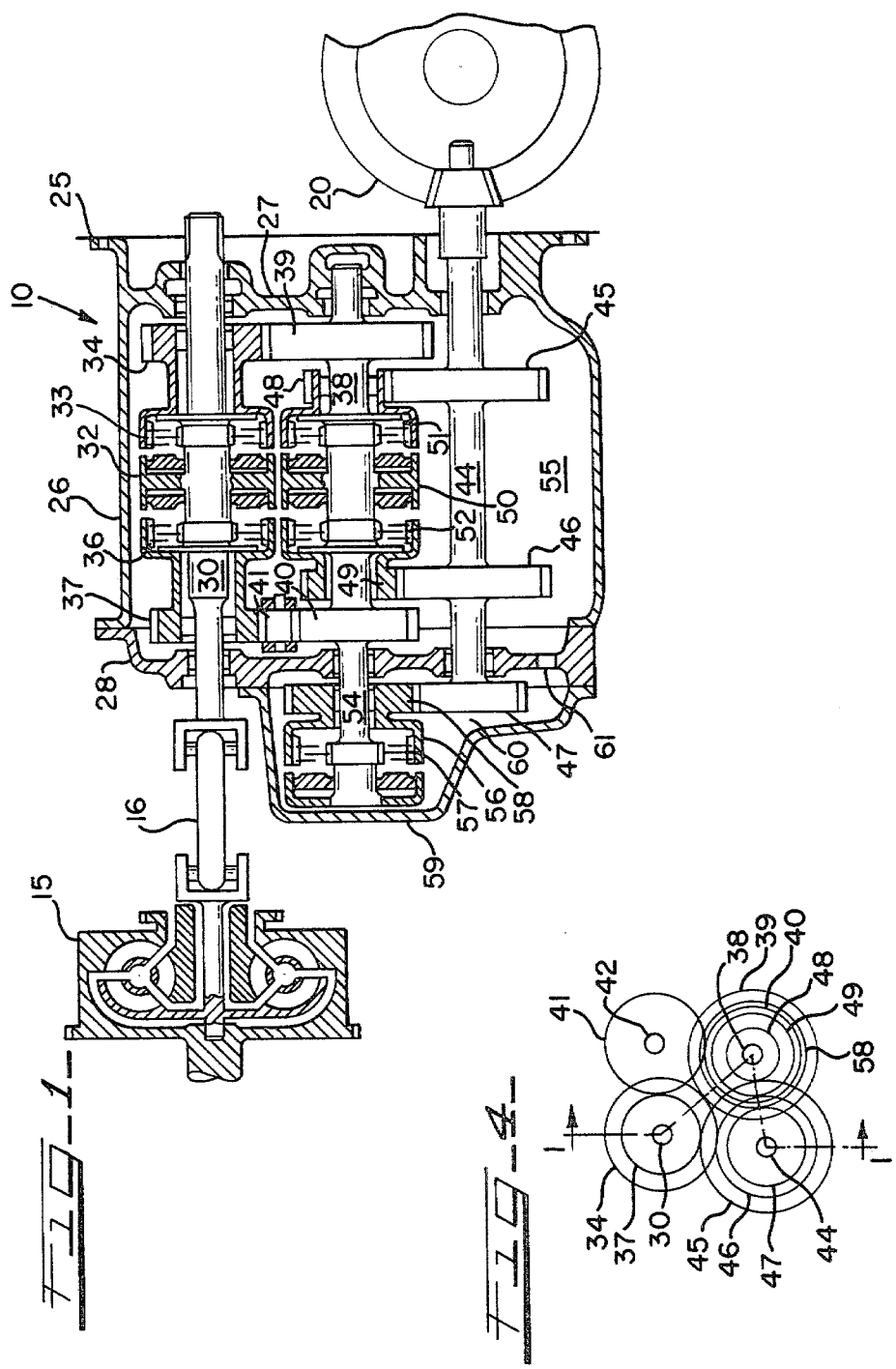

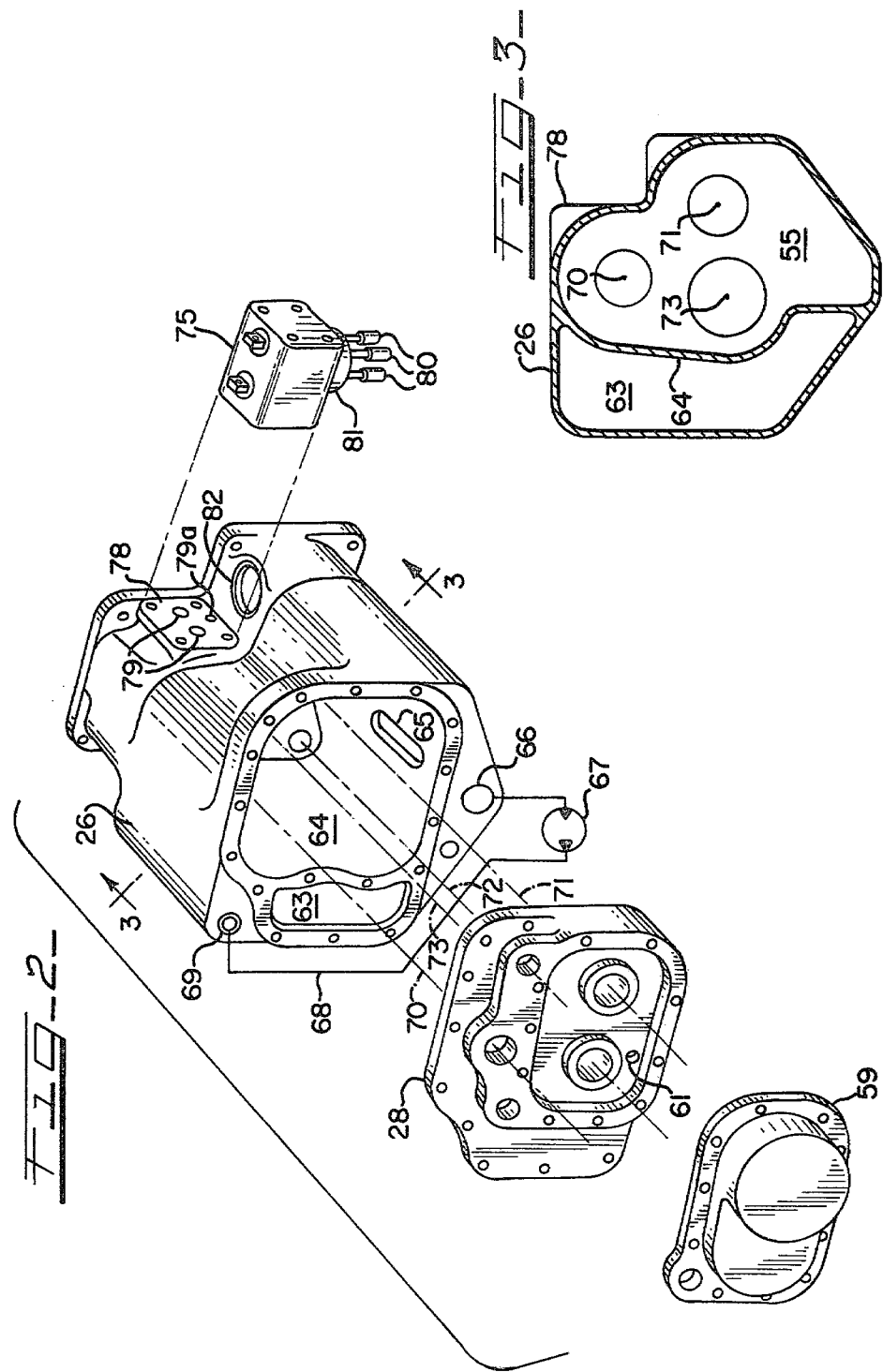

1

POWER-SHIFT COUNTERSHAFT TYPE TRANSMISSION

BACKGROUND OF THE INVENTION

The present invention relates generally to mechanical transmission devices in which multiple gear ratios and output shaft direction of rotation are selectively obtainable by fluid pressure actuated clutches.

While the invention is particularly adaptable to propulsion drive systems of heavy duty self-propelled vehicles such as crawler tractors, unique features herein disclosed are readily adaptable to other machines requiring variable ratio drive. A relatively few number of gears and shafts, compared to conventional transmissions, are housed in a compact space-saving housing in which the oil supply for the system is separated from the rotating components. Such an arrangement in the present invention results in more effective use of materials and greater power transmission efficiency. More particularly, this is accomplished in the present invention by placing one of the speed ratio clutches and associated gears in a cantilevered position on ends of their respective shafts and by forming a separate oil compartment in the housing so that oil splash is eliminated. The innovative arrangement of elements as well as other features including a novel arrangement of positioning the control valve on the housing in close proximity to the clutches, all tend to reduce cost, use less material and conserve energy.

Transmission housings are known that have provision for maintaining an oil supply in a compartment separate from a rotating components compartment. An example of prior art is as disclosed in U.S. Pat. No. 2,743,627 granted to H. W. Christenson May 1, 1956. However, limitations in the prior art do not permit the combination of housing structure, including a recessed portion for attaching the control valve in close proximity to work elements. Dimensional advantages are apparent in the preferred embodiment of the present invention as well as other advantages that will become apparent in the hereinafter disclosed invention.

Conventionally, multi-speed power-shift transmissions, which are frequently referred to as of a countershaft type, include a pair of friction clutches and associated gears operatively assembled on a speed clutch shaft. The speed clutch shaft is supported adjacent to its ends by bearings carried in end walls of a transmission housing. Power input to the speed clutch shaft, in transmissions having an equal number of forward and reverse speed ratios, is provided by forward and reverse clutches assembled on an input shaft that is also supported by bearings in the housing end walls. A gear on the forward clutch adjacent to one housing end wall drives a gear on the speed clutch shaft and a gear on the reverse clutch adjacent to the other housing end wall drives through a reverse idler gear to another gear on the speed clutch shaft. The reverse idler gear is carried on its own countershaft. The speed clutch shaft can therefore be selectively driven in either a forward or reverse direction by alternately engaging the forward and reverse clutches. The pair of speed ratio clutches each has a drive gear that meshes, in ratio-determining relationship, with a respective driven gear on a power output shaft. Since the pitch diameters of the speed ratio gears are chosen different for the two speed clutches, two output shaft speeds are selectively available. The aforedescribed prior art is substantially adapted in association with the present invention.

Heretofore, if more than two speed ratios are required, such as three speeds in each direction, it has been customary to provide another speed clutch shaft along with additional bearings, gears and the necessary fluid pressure transfer means. The additional number of components such as gears, shafts and bearings as well as the increased complexity of the housing in providing additional bearing bores and pressure fluid manifolds and passages, are substantially reduced in the present invention.

SUMMARY OF THE INVENTION

It is therefore an object of the present invention to provide an improved power-shift countershaft type transmission.

Another object is to provide a transmission capable of being produced at a relatively low cost.

A further object is to provide a transmission that can be produced and will operate more efficiently whereby energy resources will be, both indirectly and directly, conserved.

Still another object is to provide a transmission in which the location of the hydraulic control is effective for improved clutch engagement response and efficient utilization of fluid pressure.

A still further object is to provide a transmission in which a transmission housing has external form that is particularly dimensioned to conform to surrounding components of a vehicle in which it is used.

The foregoing and other objects and advantages are achieved in practice by providing a multi-speed forward and reverse countershaft type power-shift transmission which has speed clutches forward and reverse clutches, housing compartments, a control valve attachment location and various related components arranged whereby the transmission is capable of being produced at relatively low cost and of conserving energy.

DESCRIPTION OF THE DRAWINGS

The exact manner in which these and other objects and advantages are achieved will become more clearly apparent when reference is made to the following detailed description of the preferred embodiment of the invention set forth by way of example and shown in the accompanying drawings, in which like reference numbers indicate corresponding parts throughout.

FIG. 1 is a sectional view of a transmission constructed in accordance with a preferred embodiment of the present invention in which certain elements are shown displaced from their true positions for clarity and generally as viewed in a plane indicated by Roman numerals I—I of FIG. 4.

FIG. 2 is an isometric exploded view showing the transmission housing and a control valve associated therewith and schematically showing a fluid transfer means.

FIG. 3 is a cross section view of the transmission housing taken generally as indicated by a plane identified by Roman numerals III—III of FIG. 2.

FIG. 4 is a schematic of the transmission shafts and gears showing their relationship one to another.

DETAILED DESCRIPTION OF THE INVENTION

A multi-speed forward and reverse countershaft type power-shift transmission of the present invention has a speed ratio clutch for each of a plurality of speeds. The speed clutches are assembled on a single speed clutch shaft in which one speed clutch is on a cantileverly projecting end of the shaft. The speed clutch shaft is in driven relationship with forward and reverse clutches which are operatively associated on a transmission input shaft. The speed ratio clutches are in driving relationship with a separate output shaft. A housing for the transmission is formed with a wall separating an oil chamber from a rotating parts chamber. Provision is made for transferring oil from the gear chamber to the oil chamber. The housing also has provision for externally releasably attaching a control valve on a side opposite to that of the oil chamber and in close proximity to pressure fluid manifolds associated at an end of the forward and reverse clutch shaft and of the speed clutch shaft. The result is a transmission capable of being produced at reduced cost which uses less material and conserves energy.

With reference to FIG. 1, a transmission generally identified by the numeral 10 has power input from a torque converter 15 and drive coupling 16. The torque converter 15 is operatively associated with an engine, not shown. The transmission 10 power output is coupled to a vehicle propulsion drive system, not shown, but which includes an axle ring gear and pinion set 20. Vehicles embodying the aforementioned components are generally well known particularly with regard to construction machinery such as crawler tractors.

The transmission 10 includes a housing assembly 25 which is comprised of a housing portion 26 formed with a fixed wall 27 longitudinally adjacent to one end thereof. The housing assembly 25 also includes an end wall 28 releasably secured to the housing portion 26 at another end opposite to that of the fixed wall 27. Each of the walls have bearing bores which are aligned one with relation to the other for receiving bearings for rotatably supporting various transmission shafts as hereinafter described with reference to both FIG. 1 and FIG. 4.

An input shaft 30 is driven by the drive coupling 16 from the torque converter 15. A direction control clutch pack assembly 32 operatively associated with the input shaft 30 includes a pair of clutches in which a forward clutch 33 is selectively engagable for transmitting power from the input shaft 30 to a forward drive gear 34. Similarly, a reverse clutch 36 is selectively engagable for transmitting power from the input shaft 30 to a reverse drive gear 37.

It is seen that the input shaft 30 is rotatably supported on suitable bearings at one end adjacent to the forward drive gear 34 by the fixed wall 27 of the housing portion 26 and at the other end adjacent to the reverse drive gear 37 by the end wall 28.

In the present preferred embodiment of the invention, a plurality of three selective speed ratios are provided in association with a speed shaft 38. The speed shaft 38, has fixed thereon, forward driven gear 39 which is in constant mesh with the forward drive gear 34. A reverse driven gear 40 is in constant mesh with a reverse idler gear 41 which is in constant mesh with the reverse drive gear 37. The speed shaft 38 is rotatably supported adjacent to the forward driven gear 39 by suitable bearings in the fixed wall 27 and adjacent to the reverse driven gear 40 by suitable bearings in the end wall 28. The reverse idler gear 41 is carried by bearings on a reverse idler shaft 42 which is supported by the housing 26 on the end wall 28.

An output shaft 44 is rotatably supported by suitable bearings at the fixed wall 27 and at the end wall 28 in much the same manner as described with regard to the speed shaft and the input shaft. The output shaft 44, in the preferred embodiment, has three gears fixed thereon and herein identified by numerals in which a first driven gear is 45, a second driven gear is 46 and a third driven gear is 47. The first and second driven gears, 45 and 46 respectively, are spaced axially on the output shaft 44 between the fixed wall 27 and the end wall 28. They are in constant mesh respectively with a first drive gear 48 and a second drive gear 49, both of which are concentrically rotatable with relation to the speed shaft 38. A speed control double clutch pack assembly 50 is operatively associated concentrically about the speed shaft 38 and includes a pair of clutches in which a 1st speed clutch 51 has the first drive gear 48 selectively operable therewith. A 2nd speed clutch 52 has the second drive gear 49 selectively operable therewith.

In the present invention the speed shaft 38 has a shaft extension portion 54 formed thereon which projects externally of a main rotating components compartment 55 which is formed in the housing assembly 25. A single clutch pack assembly 56 is carried on the shaft extension 54 and includes a 3rd speed clutch 57 and a third drive gear 58 which is in constant mesh with the third driven gear 47. It is to be understood that the third driven gear 47 is fixed to an end of the output shaft 44 which extends through the end wall 28 and is externally located with relation to the main rotating components compartment 55.

A cover 59 is removably secured to the end wall 28 on a side longitudinally opposite from the compartment 55 thereby forming a secondary rotating components compartment 60. A gravity flow passage 61 is formed in the end wall 28 for passage of fluid from the compartment 60 to the compartment 55.

The main and secondary rotating components compartments 55 and 60, respectively, including their functions and relationship to other components of the transmission 10, is described with reference to FIGS. 2 and 3. A transmission sump 63 is formed in the housing portion 26, laterally adjacent to the main rotating compartment 55, by the presence of a longitudinally substantially vertically disposed divider wall 64. The divider wall 64 provides a fluid tight barrier, in combination with fixed wall 27 and end wall 28, between the main rotating components compartment 55 and the transmission sump 63.

In power shift transmissions of the type herein disclosed, fluid under pressure is used to selectively engage forward and reverse clutches and speed clutches. Also, fluid is distributed through passages in clutch shafts to lubricate and cool clutch plates when clutches are disengaged. It is readily understood that a substantial volume of fluid is therefore expelled from fluid actuated clutches into a compartment containing these clutch components.

It is to be understood that the disclosure of the present invention includes provision for fluid actuation, as well as lubrication and cooling, of the forward and reverse clutches 33 and 36, respectively, and of the 1st, 2nd and 3rd speed clutches 51, 52 and 57, respectively. Expelled fluid from the 3rd speed clutch 57 flows from the secondary rotary components compartment 60 through the gravity flow passage 61 into the compartment 55. This flow combines with expelled fluid from the 1st and 2nd speed clutches 51 and 52, respectively, and the forward and reverse clutches 33 and 36, respectively. The combined fluid flow is drawn through a transfer passage 65 which is located in a bottom part of the housing portion 26 in the main rotary components compartment 55. The transfer passage 65 is connected by a fluid passage to an outlet port 66 in the housing portion 26. A scavenger or transfer pump 67 draws the fluid from the compartment 55 and transfers it through a transfer conduit 68 and inlet port 69 into the transmission sump 63. The gears and clutch packs, which constitute major rotating components of the transmission 10, therefore operate in a splash-free environment.

With further reference to FIGS. 2, 3 and 4, it will be noted that the input shaft 30 is coincident with an input shaft axis 70, the speed shaft 38 is coincident with a speed shaft axis 71, the reverse idler shaft 42 is coincident with a reverse idler shaft axis 72, and the output shaft 44 is coincident with an output shaft axis 73. The purpose of identifying the axes of the shafts is to show, in particular in FIGS. 2 and 3, the location of the input shaft 30 on its axis 70 and the location of the speed shaft 38 on its axis 71 with relation to a transmission control valve 75. As was previously explained, the input shaft 30 has associated therewith the forward clutch 33 and the reverse clutch 36. Also, the speed shaft 38 has associated therewith the 1st, 2nd and 3rd speed clutches 51, 52 and 57, respectively. Control of all of these clutches is provided by means of the transmission control valve 75 which is operable to supply fluid pressure from a pressure source. The pressure source is not shown but is well known in the art, as also is the means for conducting the pressure fluid from conduits to rotating shafts. The present invention pertaining to the relationship between the control valve 75 and the input and speed shafts 30 and 38 respectively, is as hereinafter described.

A valve mounting pad 78 is formed externally on the housing portion 26 in a vertically and longitudinally oriented location laterally adjacent to the input shaft 30 and axis 70. The transmission control valve 75 is releasably secured to the valve mounting pad 78, which permits a plurality of direction control fluid passages 79 to communicate fluid flow and pressure between the valve 75 and the forward and reverse clutches 33 and 36. A similar passage 79a is effective to communicate fluid flow exhaust from the valve 75 to the interior of housing assembly 25. Communication is further accomplished by providing a manifold connected with the passages 79 and including annular grooves, seals and fluid passages in the input shaft 30. The fluid communication means between the passages 79 and the clutches 33 and 36 is well known in the power-shift transmission art and, therefore, is not fully detailed in this disclosure. Similar fluid communication is provided between the valve 75 and the speed shaft 38 except as hereinafter otherwise defined.

A fluid transfer manifold, not identified in the drawings, is interposed between an end portion of the speed shaft 38 and a plurality of speed control fluid conduits 80 which depend from the valve 75. A seal ring 81 is fixedly associated with the conduits 80 and is received in fluid sealing relationship with an aperture 82 formed in a horizontally positioned wall of the housing portion 26 when the valve 75 is in its securely mounted position. The conduits 80 each sealingly engage holes in the previously mentioned fluid transfer manifold and, through fluid passages in the speed shaft 38, communicate fluid flow and pressure between the first, second and third speed clutches 51, 52 and 57 respectively.

It can therefore be seen that the particular location and mounting of the control valve 75 in a recess formed by right angularly positioned walls of the housing portion 26 is in close proximity to the clutch carrying shafts, input shaft 30 and speed shaft 38. This, in combination with the aforementioned cantileverly supported 3rd speed clutch and gears, along with provision for splash-free operation of the rotating components, produces a relatively low cost energy conserving transmission device.

Having thus described a preferred embodiment, the present invention is seen to provide a novel three speed forward and three speed reverse transmission having utility in the field of power transmission. Several advantages and characteristics, including those apparent from the foregoing description and others, are inherent in the invention. It is anticipated that changes and modifications of the described form of the transmission will occur to those skilled in the art and that such changes and modifications may be made without departing from the spirit of the invention or the scope of the appended claims.

What is claimed is:

1. A power-shift countershaft type transmission comprising:
    a transmission housing having a first end wall and a second end wall which is releasably secured to said housing in spaced relationship to said first end wall,
    said first and second end walls each having aligned bearing bores therein for rotatably supporting power transmission means,
    a dividing wall formed within said housing in a position between said first and second end wall to form a main rotating components compartment and a sump compartment,
    power transmission means rotatably supported by said first and second end wall bearing bores providing forward, reverse, and change-speed transmission of power,
    control means operatively connected to said transmission for selectively controlling the transmission of power from said power transmission means, and
    fluid transfer means coupled between said main rotating components compartment and said sump compartment, for transferring fluid therebetween to operate said power transmission means in a substantially splash-free environment.

2. A transmission as defined in claim 1 wherein said power transmission means comprises:
    a plurality of power transmission shafts and gears rotatably supported in the bearing bores of said first and second end walls, and
    a plurality of power transmission clutch and gear portions operatively coupled to said plurality of power transmission shafts and gears including a forward drive portion, a reverse drive portion, a first speed portion, a second speed portion, and a third speed portion, which is positioned externally of said main rotating components compartment.

3. A transmission as defined in claim 1 wherein said control means includes a hydraulic valve releasably secured to said housing within an external recess formed therein and further including fluid conduits for coupling fluid pressure from said hydraulic valve to said power transmission means.

4. A transmission as defined in claim 1 wherein said fluid transfer means includes a fluid pump.

5. A transmission as defined in claim 1 wherein said power transmission means comprises:
- an input shaft assembly including a forward clutch and gear portion and a reverse clutch and gear portion, rotatably supported by said first and second end walls bearing bores and positioned in said main rotating components compartment,
- a speed shaft assembly rotatably supported by bearing bores in said first and second end walls,
- a reverse idler gear rotatably supported by said housing in driven relationship with said reverse clutch and gear portion,
- said speed shaft assembly including a speed shaft having fixed thereon a forward driven gear in driven relationship with said forward clutch and gear portion, and a reverse driven gear in driven relationship with said reverse idler gear,
- a transmission end cover releasably secured to said second end wall of said transmission housing on a side opposite of said main rotating components compartment for forming a secondary rotating components compartment,
- said second end wall formed with a fluid transfer aperture therein for passing fluid from said secondary rotating components compartment to said main rotating components compartment,
- said speed shaft assembly further including a first speed clutch and gear portion, a second speed clutch and gear portion, and a third speed clutch and gear portion, all of which are selectively drivable by said speed shaft in response to said control means, and
- an output shaft assembly rotatably supported in said bearing bores of said first and second end walls having fixed therewith, a first speed driven gear in driven relationship with said first speed clutch and gear portion, a second speed driven gear in driven relationship with said second speed clutch and gear portion, and a third speed driven gear in driven relationship with said third speed clutch and gear portion.

6. A transmission as defined in claim 5 wherein said third speed clutch and gear portion, and said third speed driven gear are cantileverly carried on said speed shaft and said output shaft, respectively.

7. A transmission as defined in claim 6 wherein said third speed clutch and gear portion, and said third speed driven gear are contained within said secondary rotating components compartment.

8. A transmission as defined in claim 5 wherein said control means includes a hydraulic valve releasably secured to said housing within an external recess formed therein and further including fluid conduits for coupling fluid pressure from said hydraulic valve to said forward and reverse clutch and gear portions and to said first, second, and third speed clutch and gear portions.

9. A transmission as defined in claim 5 wherein said fluid transfer means includes a fluid pump.

* * * * *